United States Patent Office 3,437,906
Patented Apr. 8, 1969

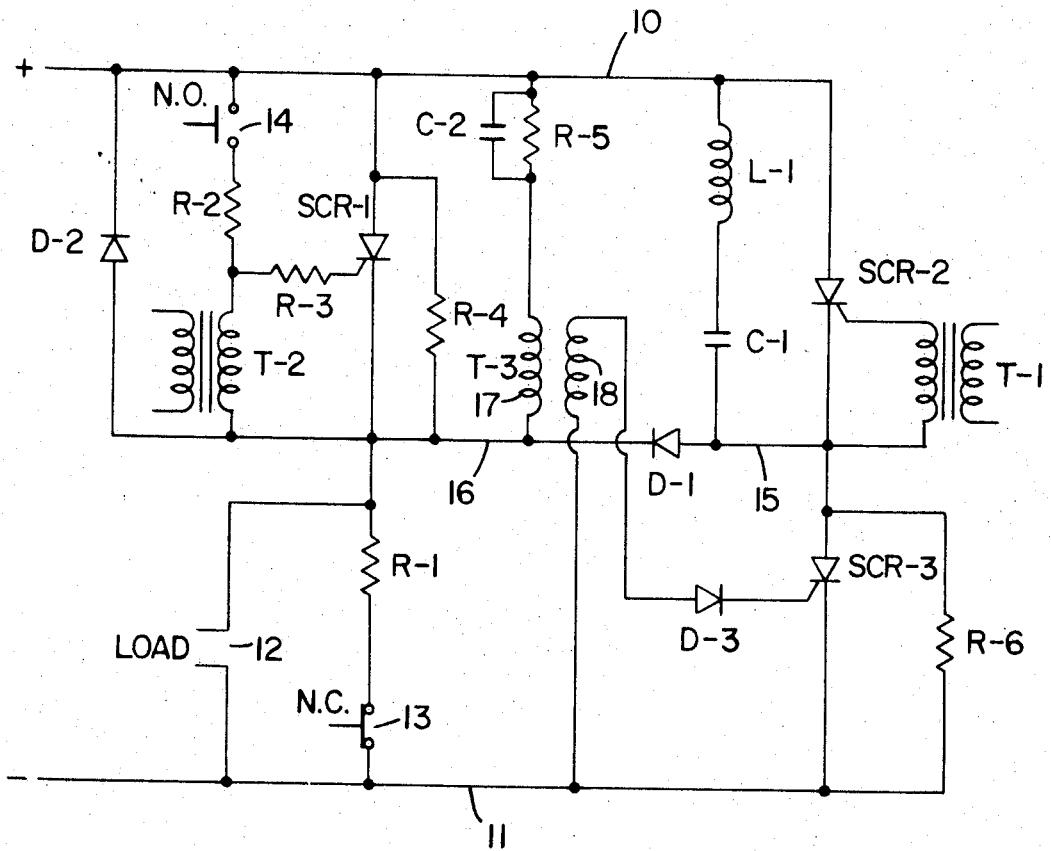

3,437,906
D-C CHOPPER
William Brooks, 1042 Inverness Way,
Sunnyvale, Calif. 94086
Filed June 6, 1967, Ser. No. 643,970
Int. Cl. H02m 7/52, 7/78
U.S. Cl. 321—43                                     11 Claims

ABSTRACT OF THE DISCLOSURE

This D.C. chopper circuit comprises a controlled unidirectional conducting device, such as a silicon-controlled rectifier, a load in series therewith, a source of direct current connected across the load and the device, a first switching circuit responsive to a first signal for causing the device to conduct, and a second switching circuit responsive to a second signal for causing the device to cease conducting. The second switching circuit includes a second unidirectional current-conducting component connected across the device and poled to conduct current in a direction opposite thereto, and to cause a resonant circuit connected across the component. A third unidirectionally conducting member is connected between the second component and the source of direct current and is poled to conduct current in the same direction as that component; conduction in this member is caused by a switching circuit responsive to conduction of the device.

---

This invention relates to an improved direct-current chopper for converting ordinary direct-current voltage into pulsed direct current, which is also known as "chopped" direct current. The invention belongs to the class of choppers known as resonance commutation switches. The purpose of the chopper of this invention is to interrupt D.C. current for a very short period and then re-apply it.

The chopper of this invention may be used to supply current to a power shift register for a variable display device wherein information is switched by interrupting the power momentarily and then reapplying it; the data is thereby moved over one bit in the shift registers. The registers are so designed that they require a voltage to be turned off and reapplied in a very, very short period, the rise and fall time of the voltage being very abrupt. It is important that there be no overshoots in the current or voltage. The chopper of this invention accomplishes this functioning, and it does it in a somewhat unique manner.

Other objects and advantages of the invention will appear from the following description of a preferred embodiment.

The drawing is a circuit diagram of a D.C. chopper embodying the principles of the invention.

Direct current of any suitable type, whether from a battery, rectifier, or generator, is applied across a positive bus 10 and a negative bus or ground line 11.

A silicon-controlled rectifier SCR-1 is connected to the bus 10, with its cathode connected through a load 12 to ground 11. The load 12 may be a shift register like that in my patent application Ser. No. 557,148, filed June 13, 1966. A resistor R-1 and a normally closed switch 13 are in parallel with the load 12.

A normally open switch 14 connects the bus 10 through a resistor R-2 and a resistor R-3 to the gate of SCR-1. A transformer T-2 is positioned between the junction of the resistors R-2 and R-3 and the cathode of SCR-1 which is connected to a bus 16. Positive pulses to the primary of the transformer T-2 provide trigger pulses to the gate of SCR-1.

A resistor R-4 and a diode D-2 are positioned across the anode-cathode circuit of SCR-2, the diode D-2 being poled to conduct when the voltage of the bus 16 is above that of the bus 10. Also positioned across the anode-cathode circuit of SCR-1 are the parallel combination of a capacitor C-2 and a resistor R-5, which are in series with the primary winding 17 of a transformer T-3.

A second silicon-controlled rectifier SCR-2 is positioned in series with a diode D-1, the SCR-2 and D-1 series combination being connected across the anode-cathode circuit of SCR-1. SCR-2 is poled to conduct from the bus 10 toward a bus 15. A series resonant circuit composed of an inductor or coil L-1 and a capacitor C-1 is connected across the anode-cathode circuit of SCR-2, between buses 10 and 15. A transformer T-1 is positioned in the gate-cathode circuit of SCR-2 and triggers SCR-2 when positive pulses are supplied to the primary winding thereof.

A silicon controlled rectifier SCR-3 is connected between the cathode of SCR-2 and the bus 11. A resistor R-6 is connected across the anode-cathode circuit of SCR-3. In addition, the secondary winding 18 of the transformer T-3 provides trigger pulses to SCR-3 through a diode D-3 when positive pulses are applied to the primary winding 17.

The chopper circuit is operated in the following manner:

In order to supply current to the load 12 on the startup, the push button switch 14 is pushed, supplying positive voltage from the supply 10 to the gate of SCR-1, thereby firing the SCR-1 so that it becomes conducting. This, in turn, supplies current from the positive bus 10 down through SCR-1, through the resistor R-1, and normally closed switch 13 to ground 11, and also through the load circuit 12 to ground. Once fired, the SCR-1 remains on, that is, in the conducting state, and does so until it is commutated off. At this point, the chopper is supplying current to the load 12 (which may be shift registers, and sign lights can be operated by operating the shift register in its normal manner.)

On a signal to shift, the chopper is to turn the power to the load 12 off momentarily and then turn it back on. The transformer T-1 is polarized in such a way that a positive trigger is supplied between the gate and the cathode of the SCR-2. There is a path from the positive bus 10 through the coil L-1, the capacitor C-1 and the resistor R-6 to the negative bus 11, so that the capacitor C-1 has been charged to the supply voltage.

When SCR-2 fires, it forms a short circuit across the series coil L-1 and capacitor C-1, and current flows in the loop formed by the capacitor C-1, the coil L-1, and SCR-2, back to the capacitor C-1. The values of the coil L-1 and capacitor C-1 are such as to provide a resonant discharge path. Therefore, the capacitor C-1 will discharge while a sinusoidal voltage is provided by the resonant circuit. Accordingly, during one half cycle of the sinusoidal discharge, current will flow from capacitor C-1 through coil L-1 and SCR-2 back to C-1. During the second half cycle, current cannot flow through SCR-2 due to its unidirectional current conducting property. The current path therefore goes from the coil L-1 to the capacitor C-1 and through the diodes D-1 and D-2 back to the coil L-1 as the field of the coil L-1 breaks down, thereby charging up the capacitor C-1. The voltage in the capacitor is reduced by the amount of the circuit losses in producing this oscillation.

When current is flowing through the diode rectifiers D-1 and D-2 back to the coil L-1, there is a voltage drop across the diode D-2 in a forward direction due to the forward resistance thereof. This voltage drop, in effect, is a reverse bias across SCR-1, and in producing this reverse bias, SCR-1 then turns off. Thus, at this point the current to the load 12 has been interrupted. The system then is in a stable state, that is, the capacitor C-1 has returned to its original charge, SCR-1 is off, and no current is being supplied to the load 12.

During the second half of the cycle, as current is flowing from the coil L-1 through the capacitor C-1 and the diodes D-1 and D-2, the voltage at the bus 15 will be higher than at the bus 10, thereby providing a reverse bias across SCR-2 and turning it off. Therefore both SCR-1 and SCR-2 will be off at this time.

At this time, a trigger pulse is applied to the primary of the transformer T-2 in such a way as to supply a positive pulse to the gate of SCR-1. This in turn turns SCR-1 on again, and again the system is in a stable state supplying current to the load.

The resistor R-6 enables the capacitor C-1 to charge to the bus voltage when the system is first turned on. Therefore, that voltage will be available for the first commutating pulse or oscillation. The resistor R-4 shunts SCR-1 and is in series with the resistor R-1, which is, in turn, in series with the normally closed push button 13. If, on starting up, the push button 13 is pushed, opening the circuit, a leakage current past SCR-1 occurs through the resistor R-4 into the power shift registers. This enables all the capacitors and the power shift registers to charge. This is used only in startup. Otherwise, the shift registers on the first pulse, assuming that they were all at zero, would transfer the signal.

Normally the capacitor C-1, in order to make up the loss in voltage and charge due to the commutating pulse, has to recharge at the end of the cycle. The path for the capacitor C-1 could be to the load 12 up to the C-1, L-1 circuit back to the plus bus 10, but this would be very dependent on the load conditions. A lightly loaded circuit, that is, with a load 12 of high resistance, would result in a large time constant for charging of the capacitor C-1. In addition, it would cause commutating current to flow through the load 12, distorting the wave form. To circumvent this, the additional circuit comprising the capacitor C-2, the resistor R-5, and the coil 17 of the transformer T-3 is placed across SCR-1. Note that when SCR-1 fires at the conclusion of the cycle, the voltage drop across SCR-1 goes to nearly zero. This change of voltage is in such a direction and the polarity of the transformer T-3 is so arranged that the transformer T-3 in turn supplies a positive voltage to the gate of SCR-3. Anode voltage is simultaneously supplied to SCR-3 due to the transient charging current passing through the circuit composed of L-1 and C-1. This fires SCR-3, supplying a very low impedance path to recharge the capacitor C-1. The result is that when SCR-1 fires, SCR-3 also fires and rapidly charges C-1 in anticipation of the next shift pulse. When SCR-2 is then fired and the resonant circuit L-1, C-1 later turns off SCR-2, no current can then pass to SCR-3, which is thereby forced to turn off.

Although this particular circuit belongs to the family called "resonant commutated switches," it differs from the others in that none of the commutating current flows through the load. The result is that wave form distortion does not occur due to commutating current. Also, the commutating capacitor does not charge through the load, which also produces distortion. There are some other commutated switches which use a separate resistor to recharge the capacitor, but for high-frequency, high-current chopping, the second resistor dissipates almost as much power as the load; so the efficiency of such devices is less than fifty percent.

A particular feature of the circuit of the present invention is that it uses very little commutating power, made up through SCR-3, and none of the commutating current flows through the load resistor. One of the significant differences is the operation of SCR-3. When the current is first supplied to the load. SCR-3 comes on controlled by SCR-1, and it can very, very rapidly charge up the capacitor C-1 due to the small time constant of the charging circuit (SCR-3, L-1, C-1).

Another significant feature of this circuit is that SCR-2 is the only silicon-controlled rectifier or diode in series with the L-C circuit during the first half of the cycle. This materially reduces the losses on the first half cycle. Prior-art circuits have two or three diodes in series and these increase the losses considerably.

Another feature of the present circuit is that the control system is set up so that at the end of each shift cycle, the load is being supplied with current again. Prior art circuits have required an additional cycle to go through to resupply the load.

As an example only of values, the following table is given:

| | | |
|---|---|---|
| C-1 | mfd | 10 |
| C-2 | mfd | 0.1 |
| L-1 | microhenries | 25 |
| R-1 | ohms | 500 |
| R-2 | do | 2000 |
| R-3 | do | 220 |
| R-4 | do | 47,000 |
| R-5 | do | 10,000 |
| R-6 | do | 47,000 |

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A D-C chopper circuit which comprises
a first controlled unidirectional conducting device,
a load in series with said first device,
a source of direct current connected across said first device and said load,
means responsive to a first signal for causing said first device to conduct,
means responsive to a second signal for causing said first device to cease conducting, said last mentioned means including
a second unidirectional current conducting device connected across said first device and poled to conduct current in a direction opposite to said first device, and control means responsive to said second signal to cause current to flow through said second device and cut off said first device, said control means including a series L-C resonant circuit connected across the anode-cathode circuit of said second device and a third controlled unidirectional conducting device across said L-C resonant circuit,
a fourth controlled unidirectional conducting device connected between said third device and said source of direct current and poled to conduct current in the same direction as said third device, and
means responsive to conduction of said first device for causing conduction in said fourth device.
2. The D-C chopper circuit of claim 1 having a fifth unidirectional conducting device for isolating said fourth unidirectional conducting device from said first unidirectional conducting device.
3. A D-C chopper circuit which comprises
a first controlled unidirectional conducting device,
a load in series with said first device,
a source of direct current connected across said first device and said load,
means responsive to a first signal for causing said first device to conduct,
means responsive to a second signal for causing said first device to cease conducting, said last mentioned means including
a second unidirectional current conducting device connected across said first device and poled to conduct current in a direction opposite to said first device, and control means responsive to said second signal to cause current to flow through said second device and cut off said first device, said control means including a resonant circuit connected across said second device and a third unidirectional current conducting device connected across said resonant circuit, a fourth unidirectional conducting device connected between said third device and said source of direct current and poled to conduct current in the same direction as said third device, and means responsive to conduction of said first device for causing conduction in said fourth device.

4. The D-C chopper circuit of claim 3 having fifth unidirectional conducting device for isolating said fourth unidirectional conducting device from said first unidirectional conducting device.

5. A D-C chopper circuit which comprises
a first controlled unidirectional conducting device,
a load in series with said first device,
a source of direct current connected across said first device and said load,
means responsive to a first signal for causing said first device to conduct,
means responsive to a second signal for causing said first device to cease conducting, said last mentioned means including
a second unidirectional current conducting device connected across said first device and poled to conduct current in a direction opposite to said first device, and control means responsive to said second signal to cause current to flow through said second device and cut off said first device,
a third unidirectional conducting device connected between said second device and said source of direct current and poled to conduct current in the opposite direction from said second device, and
means responsive to conduction of said first device for causing conduction in said third device.

6. The D-C chopper circuit of claim 5 having a fourth unidirectional conducting device for isolating said third device from said first device.

7. A D-C chopper circuit which comprises
a first silicon-controlled rectifier,
a load in series with said first silicon-controlled rectifier,
a source of direct current connected across said first silicon-controlled rectifier and said load,
means responsive to a first signal for causing said first silicon-controlled rectifier to conduct,
means responsive to a second signal for causing said first silicon-controlled rectifier to cease conducting, said last mentioned means including
a diode connected across said first silicon-controlled rectifier and poled to conduct current in a direction opposite to said first silicon-controlled rectifier and actuation means responsive to said second signal to cause current to flow through said diode and cut off said first silicon-controlled rectifier, a second silicon-controlled rectifier connected between said diode and said source of direct current and poled to conduct current in the opposite direction from said diode, and means responsive to conduction of said first silicon-controlled rectifier for causing conduction in said second silicon-controlled rectifier.

8. The D-C chopper circuit of claim 7 having an additional diode isolating said second silicon-controlled rectifier from said first silicon-controlled rectifier.

9. The D-C chopper of claim 7 wherein said actuation means includes a resonant circuit connected across said diode.

10. The D-C chopper of claim 9 wherein said resonant circuit is a series L-C circuit connected across the anode-cathode circuit of said diode.

11. A D-C chopper of the resonance commutation switch type, including in combination
a positive bus,
a negative ground,
a first SCR in series with a load between said bus and ground,
a first resistor in parallel with said load,
a second resistor and a third resistor in series between the bus and the gate of the first SCR,
a second SCR and a third SCR in series between said bus and ground,
a first transformer having its secondary connected to the gate of the second SCR, said second SCR being connected through a first diode to the cathode of said first SCR and through a secondary of a second transformer to said third resistor and through a second diode to said bus,
a resonant L-C circuit comprising a coil and a first capacitor in series between said bus and the cathode of said second SCR, and
a capacitance-resistance parallel network in series with a coil of a third transformer between said bus and the cathode of said first SCR, the other coil of said third transformer being connected from said ground line to the gate of said third SCR through a third diode.

References Cited

UNITED STATES PATENTS

| 3,207,974 | 9/1965 | McMurray | 321—45 |
| 3,229,191 | 1/1966 | Williamson | 321—45 |
| 3,360,712 | 12/1967 | Morgan | 321—43 |

LEE T. HIX, *Primary Examiner.*

W. M. SHOOP, JR., *Assistant Examiner.*

U.S. Cl. X.R.

321—44